DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED APRIL 14, 1970

873 O.G. 339

T873,006

USE OF POLYOLEFINS AS TEXTILE FINISHING AGENTS

Robert H. Saunders, Chadds Ford, Pa., assignor to Hercules Incorporated, Wilmington, Del., a corporation of Delaware

Continuation-in-part of application Ser. No. 717,378, Mar. 29, 1968. This application Feb. 28, 1969, Ser. No. 803,439

Int. Cl. D06m *15/26*

U.S. Cl. 117—139.4

No Drawing. 13 Pages Specification

Water repellency, shrink resistance, abrasion resistance, lubricity, and wrinkle resistance of natural fiber fabrics are improved by surface application of relatively small amounts of crystalline olefin polymers and copolymers—preferably polypropylene and copolymers of propylene and ethylene. The polymer employed is in the form of fine particles, the major portion of which are discrete particles of 0.02 to 0.4 micron diameter. These are preferably applied from dispersion in an organic liquid in which the polymer is soluble at elevated temperatures—e.g., hydrocarbons, followed by fusion of the particles by heating. Application can also be from solution or in solid particle form, followed by fusion. The polymer concentration is preferably about 0.1 to 5%.